US010635970B2

United States Patent
Frank et al.

(10) Patent No.: US 10,635,970 B2
(45) Date of Patent: Apr. 28, 2020

(54) RACETRACK SYNAPSE FOR NEUROMORPHIC APPLICATIONS

(71) Applicant: INTERNATIONAL BUSINESS MACHINES CORPORATION, Armonk, NY (US)

(72) Inventors: Martin M. Frank, Dobbs Ferry, NY (US); Jin Ping Han, Fishkill, NY (US); Masatoshi Ishii, Kanagawa-ken (JP); Timothy Phung, Milpitas, CA (US); Aakash Pushp, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 795 days.

(21) Appl. No.: 15/228,653

(22) Filed: Aug. 4, 2016

(65) Prior Publication Data
US 2018/0039881 A1    Feb. 8, 2018

(51) Int. Cl.
| G06N 3/063 | (2006.01) |
| G06F 7/00 | (2006.01) |
| G06N 3/04 | (2006.01) |
| G06N 3/08 | (2006.01) |

(52) U.S. Cl.
CPC ......... *G06N 3/0635* (2013.01); *G06N 3/084* (2013.01)

(58) Field of Classification Search
CPC ....... G06N 3/084; G06N 3/0635; Y04S 10/54
USPC .......................................................... 706/33
See application file for complete search history.

(56) References Cited

U.S. PATENT DOCUMENTS

| 5,475,304 | A | 12/1995 | Prinz |
| 6,834,005 | B1 | 12/2004 | Parkin |
| 6,898,132 | B2 | 5/2005 | Parkin |
| 7,551,469 | B1 | 6/2009 | Parkin |
| 7,667,994 | B1 | 2/2010 | Moriya et al. |
| 8,164,947 | B2 | 4/2012 | Ranjan et al. |
| 8,934,289 | B2 | 1/2015 | Annunziata et al. |
| 9,070,455 | B2 | 6/2015 | Grollier et al. |
| 9,299,747 | B1* | 3/2016 | Pellizzer ............. H01L 27/2463 |
| 2012/0163069 | A1* | 6/2012 | Grollier .................. G11C 11/16 365/158 |
| 2013/0221460 | A1* | 8/2013 | Jan .......................... H01L 43/08 257/421 |
| 2014/0015078 | A1* | 1/2014 | Huai ...................... B82Y 25/00 257/421 |

(Continued)

OTHER PUBLICATIONS

U. Shi et al.: "Phase Change From the Non-Volatile Memory Cells (English)", China Patent Application Publication CN 201510813449 A (filed Jun. 8, 2015 and published Aug. 3, 2018. (Year: 2018).*

(Continued)

*Primary Examiner* — Kuen S Lu
(74) *Attorney, Agent, or Firm* — Tutunjian & Bitetto, P.C.; Vazken Alexanian

(57) ABSTRACT

A tunable resistance device and methods of forming the same include a magnetic fixed layer having a fixed magnetization, a magnetic free layer, and a non-magnetic conductive layer directly between the magnetic fixed layer and the magnetic free layer. The magnetic fixed layer, the magnetic free layer, and the non-magnetic conductive layer are formed in a lattice of wires, with each wire in the lattice being formed from a stack of the magnetic fixed layer, the magnetic free layer, and the non-magnetic conductive layer.

17 Claims, 9 Drawing Sheets

(56) References Cited

U.S. PATENT DOCUMENTS

2014/0312400 A1    10/2014    Schmidt et al.
2015/0106316 A1*   4/2015     Birdwell .................. G06F 16/22
                                                              706/33
2015/0269478 A1*   9/2015     Datta ..................... G06N 3/063
                                                              706/33

OTHER PUBLICATIONS

S. Fukami et al., Low-Current Perpendicular Domain Wall Motion Cell for Scalable High-Speed MRAM, 2009 Symposium on VLSI Technology, Honolulu, HI, Jun. 16-18, 2009, pp. 230-231.

Kuanyao Fong, et al., Spin-Transfer Torque Devices for Logic and Memory: Prospects and Perspectives, IEEE Transactions on Computer-Aided Design of Integrated Circuits and Systems, Jan. 2016, vol. 35, No. 1.

H. Numata et al., Scalable Cell Technology Utilizing DomainWall Motion for High-speed MRAM, 2007 IEEE Symposium on VLSI Technology, Kyoto, Jun. 12-14, 2007, pp. 232-233.

Anoynomous, MIEC* Access Device for 3D-Crosspoint Nonvolatile Memory Arrays, Jan. 2013.

Stuart S. Parkin et al., Magnetic Domain-Wall Racetrack Memory, Apr. 11, 2008, vol. 320 Science, www.sciencemag.org.

* cited by examiner

RACETRACK SYNAPSE FOR NEUROMORPHIC APPLICATIONS

BACKGROUND

Technical Field

The present invention generally relates to neural networks and, more particularly, to neural networks implemented with native devices that use racetrack structures for synapse weights.

Description of the Related Art

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error.

ANNs are conventionally implemented as software or with complicated weighting circuitry.

SUMMARY

A tunable resistance device include a magnetic fixed layer having a fixed magnetization, a magnetic free layer, and a non-magnetic conductive layer directly between the magnetic fixed layer and the magnetic free layer. The magnetic fixed layer, the magnetic free layer, and the non-magnetic conductive layer are formed in a lattice of wires, with each wire in the lattice being formed from a stack of the magnetic fixed layer, the magnetic free layer, and the non-magnetic conductive layer.

A neural network includes multiple neurons, with a layer of input neurons, one or more layers of hidden neurons, and a layer of output neurons. The neural network further includes arrays of synapses, each array of synapses being configured to accept voltage pulses from a first layer of neurons and to output current to a second layer of neurons during a feed forward operation, each synapse in each array of synapses having a respective settable resistance. Each synapse includes a magnetic fixed layer having a fixed magnetization, a magnetic free layer, and a non-magnetic conductive layer directly between the magnetic fixed layer and the magnetic free layer.

A method of forming a tunable resistance device includes forming a magnetic fixed layer having a fixed magnetization. A non-magnetic conductive layer is formed on the magnetic fixed layer. A magnetic free layer is formed on the non-magnetic conductive layer. The magnetic fixed layer, the magnetic free layer, and the non-magnetic conductive layer are formed in a lattice of wires, with each wire in the lattice being formed from a stack of the magnetic fixed layer, the magnetic free layer, and the non-magnetic conductive layer.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide a neural network architecture based on resistive state devices that store information as a resistance, where the resistance encodes a weight for a given connection between two neurons. An array of such resistive state devices is used to encode all of the weights for all of the connections between two levels of neurons. The present embodiments also provide neuron circuitry that can change the stored state of the weights, thereby providing feed-forward propagation, back propagation, and weight updates in a simple architecture. In particular, the resistive state devices are implemented as racetrack devices, which encode a resistance as the position or number of magnetic domains along the racetrack device.

Figure 1:
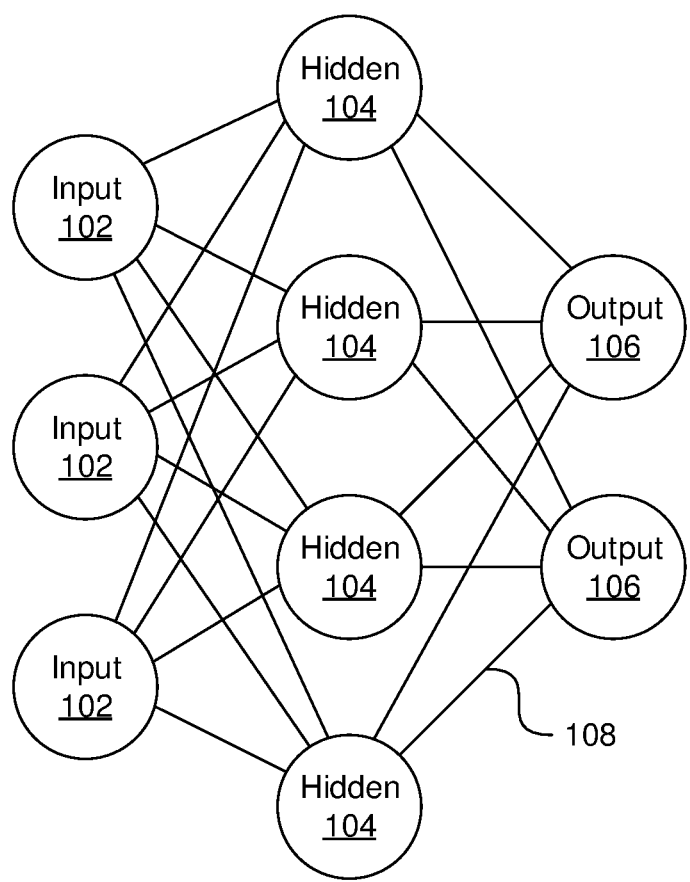
FIG. 1 is a diagram of a neural network.
Figure 2:
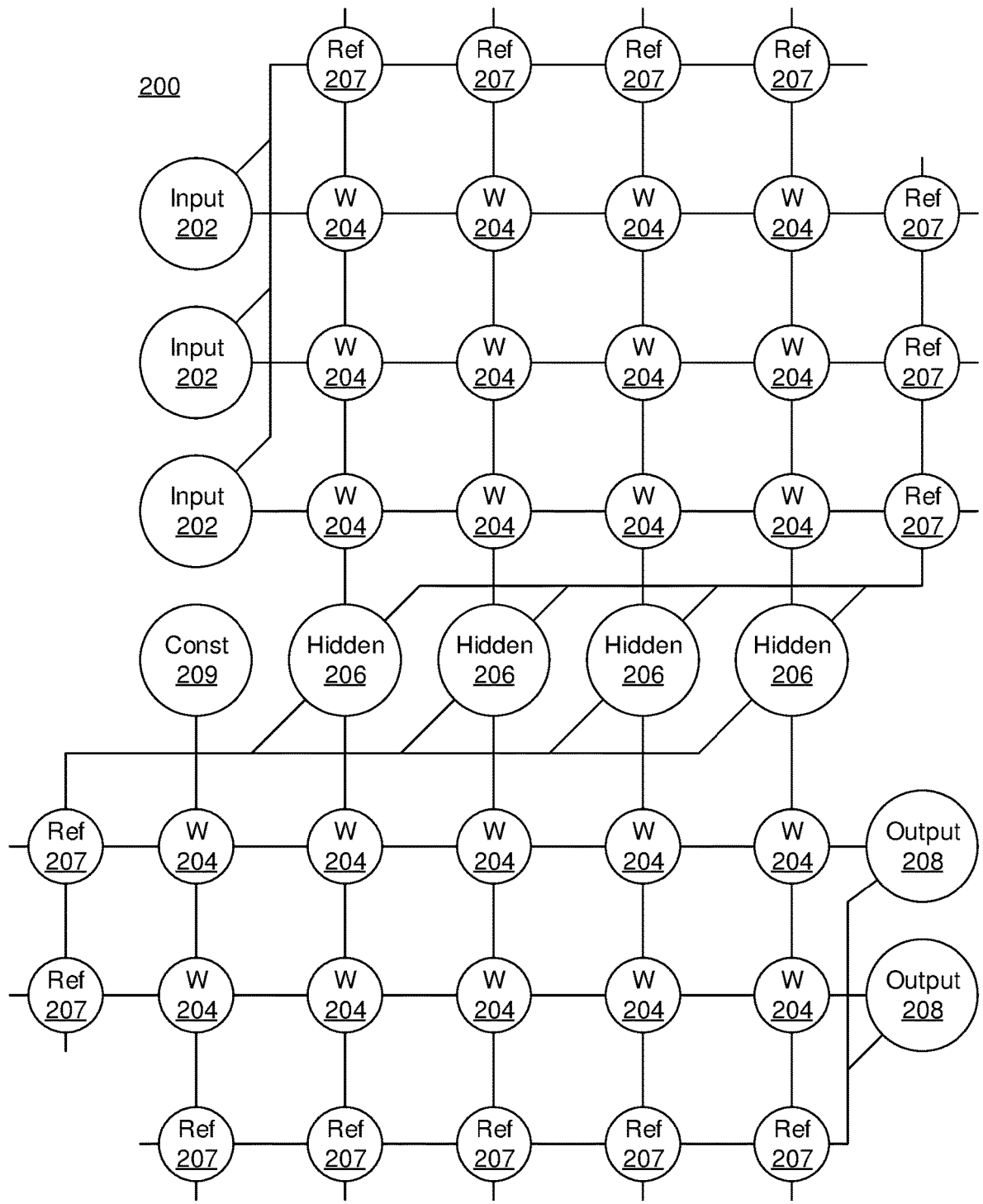
FIG. 2 is a diagram of a neural network including native hardware weights in accordance with the present principles.

Referring now to the drawings in which like numerals represent the same or similar elements and initially to FIG. 2, an artificial neural network (ANN) architecture 200 is shown. During feed-forward operation, a set of input neurons 202 each provide an input voltage in parallel to a respective row of weights 204 (also known as "synapses"). The weights 204 each have a settable resistance value, such that a current output flows from the weight 204 to a respective hidden neuron 206 to represent the weighted input. The current output by a given weight is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change current within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
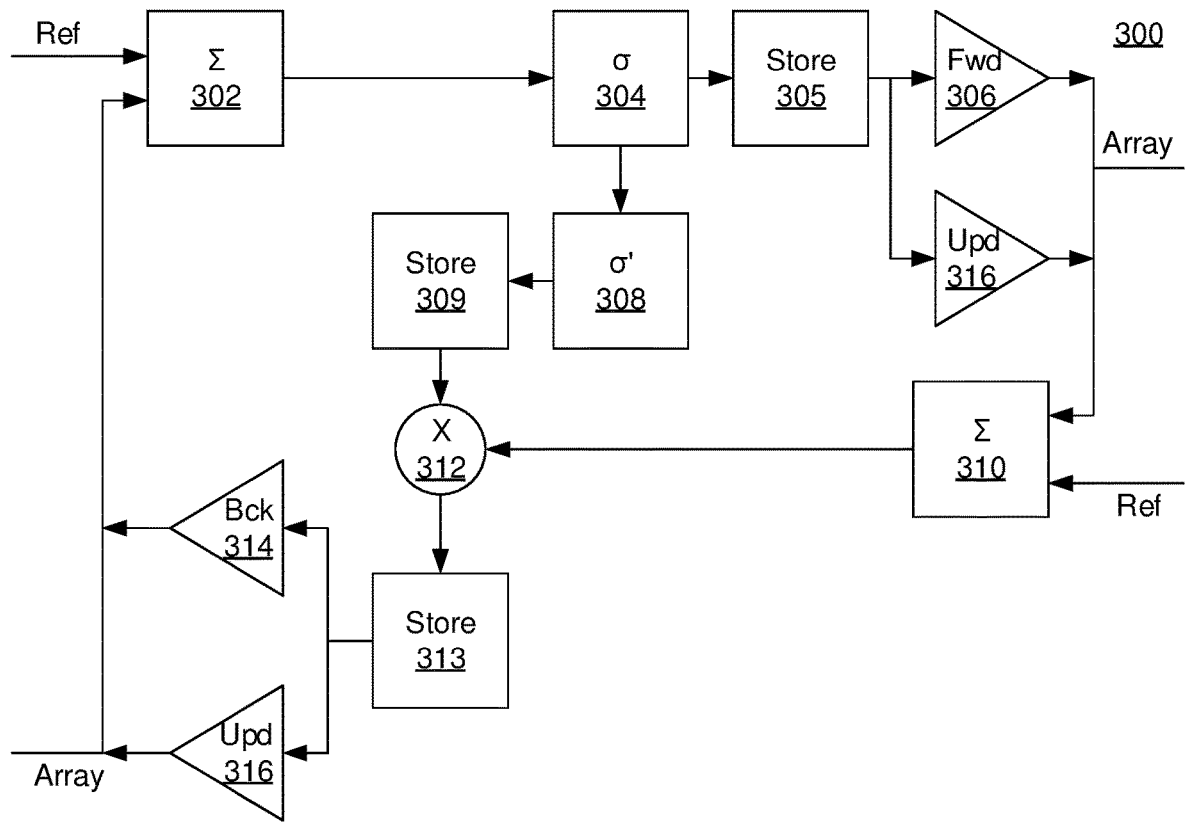
FIG. 3 is a block diagram of a circuit for reading from, writing to, and training a neural network in accordance with the present principles.

Referring now to FIG. 3, a block diagram of an exemplary neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes. Furthermore, it should be understood that the neuron 300 is shown solely for the sake of understanding the structure and function of the neural and should not be considered limiting on the present embodiments. For example, although backpropagation is specifically addressed herein, it should be understood that alternative neural network designs (e.g., those using spike-time-dependent plasticity) may be employed instead.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In general terms, the weights 204 are implemented as resistive cross point devices, where their switching characteristics have a non-linearity that can be used for processing data. The weights 204 belong to a class of device called a resistive processing unit (RPU), because their non-linear characteristics are used to perform calculations in the neural network 200. Thus, the weights 204 are tunable resistance devices. While the RPU devices may be implemented with resistive random access memory (RRAM), phase change memory (PCM), programmable metallization cell (PMC) memory, or any other device that has non-linear resistive switching characteristics, it is specifically contemplated that the RPU may be formed using a magnetoresistive racetrack structure, as described in detail below.

Figure 4:
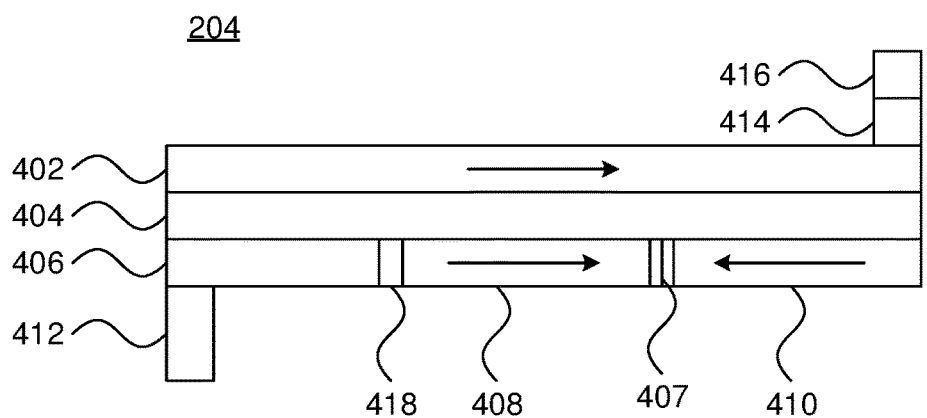
FIG. 4 is a cross-sectional diagram of a native hardware neural network weight in accordance with the present principles.

Referring now to FIG. 4, a cross-sectional view of the structure of a weight 204 is shown. The weight 204 includes a magnetic fixed layer 402 that has a fixed magnetization in a particular direction (indicated by the arrow). A non-magnetic metal layer 404 is used to separate the magnetic fixed layer 402 from a magnetic free layer 406, which can have one or more domain walls 407. Each domain wall 407 separates a parallel region 408 of the magnetic free layer 406 from an anti-parallel region 410 of the magnetic free layer 406, with the regions being determined based on whether their respective magnetizations (indicated by the arrows) are parallel to that of the fixed layer 402 or anti-parallel to that of the fixed layer 402. A first via 412 connects the weight 204 to an underlying layer, while a second via 414 connects the weight 204 to an overlaying layer. A symmetric diode 416 establishes a voltage threshold, for both feed-forward and back propagation, to prevent the domain wall 407 from being disturbed by stray voltages. In one embodiment, the symmetric diode 416 may be implemented as a mixed ionic-electronic conduction device. In a second embodiment, the symmetric diode 416 may be implemented as a symmetrical clipper, with two antiparallel diodes. It should be understood that, in an alternative embodiment, the positions of the fixed layer 402 and the free layer 406 may be exchanged without affecting the functioning of the device.

In one embodiment, which has only a single domain wall 407 as shown. In such an embodiment, the resistance of the weight 204 is determined by the position of the domain wall 407. This is because the parallel region 408 and the anti-parallel region 410 have different resistances, with the total resistance of the weight 204 being determined as:

$$R(x) = \frac{R_P x}{L} + \frac{R_{AP}(L-X)}{L}$$

where x is the position of the domain wall 407, $R_p$ is the resistance of the weight 204 when the parallel region 408 takes up the entire free layer 406, $R_{AP}$ is the resistance of the weight 204 when the anti-parallel region 410 takes up the entire free layer 406, and L is the length of the weight 204.

The free layer 406 includes zero or more notches 418. These notches 418 are positions on the free layer 406 at which the magnetic domain wall 407 becomes pinned, such that the domain wall 407 will move between notches and occupy specific, distinct positions. In this manner, a weight 204 can be formed that has specific resistance values. In an embodiment without notches 418, the domain wall position can be controlled according to the amplitude and length of the pulse used to move the domain wall.

While the structure of the weight 204 is shown as being a single, linear nanowire, it should be understood that other structures are also contemplated. In an alternative embodiment, the nanowire may have a serpentine shape, doubling back multiple times to increase the number of potential variations in resistance. In still a further embodiment, nanowire structures may be formed in a lattice or "chicken-wire" layout, with differing resistance properties depending on where on the lattice the vias are connected and what sort of path currents take through lattice.

While the present embodiments are described with respect to a stacked wire embodiment, it should be understood that alternative embodiments may be based on only the free layer 406, with resistances being determined by the number and position of domain walls within the free layer 406.

Figure 5:
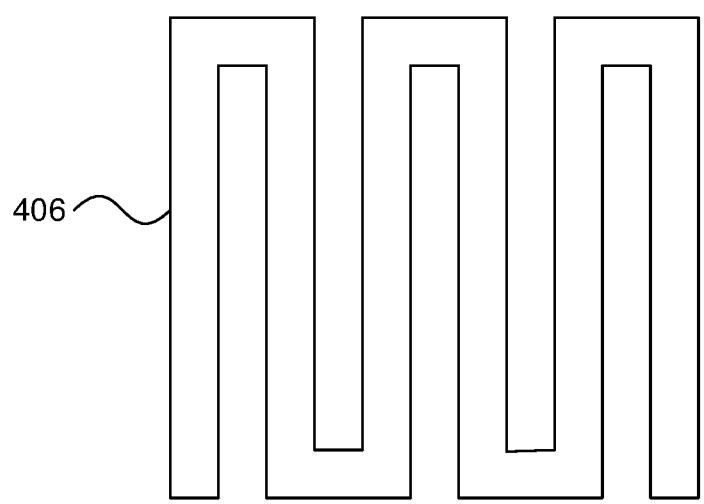
FIG. 5 is a top-down diagram of an alternative embodiment of a native hardware neural network weight in accordance with the present principles.

Referring now to FIG. 5, top-down view of a layout for a weight 204 is shown in a serpentine arrangement. In this embodiment, the free layer 406 (as well as the fixed layer 402, although that layer is not shown in this figure) doubles back to increase the length between its terminals.

Figure 6:
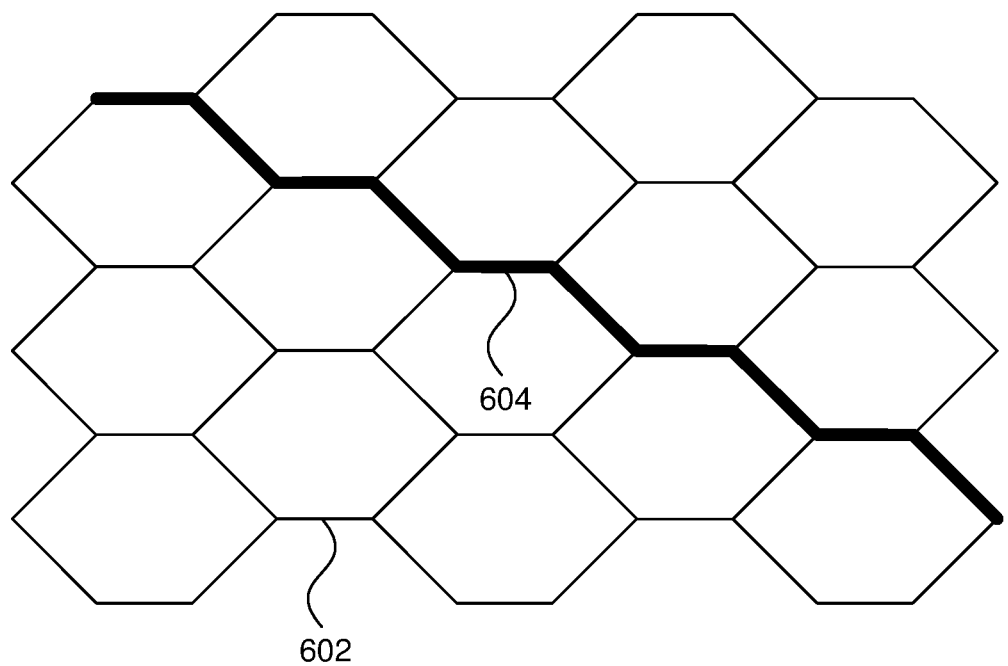
FIG. 6 is a top-down diagram of an alternative embodiment of a native hardware neural network weight in accordance with the present principles.
Figure 6:
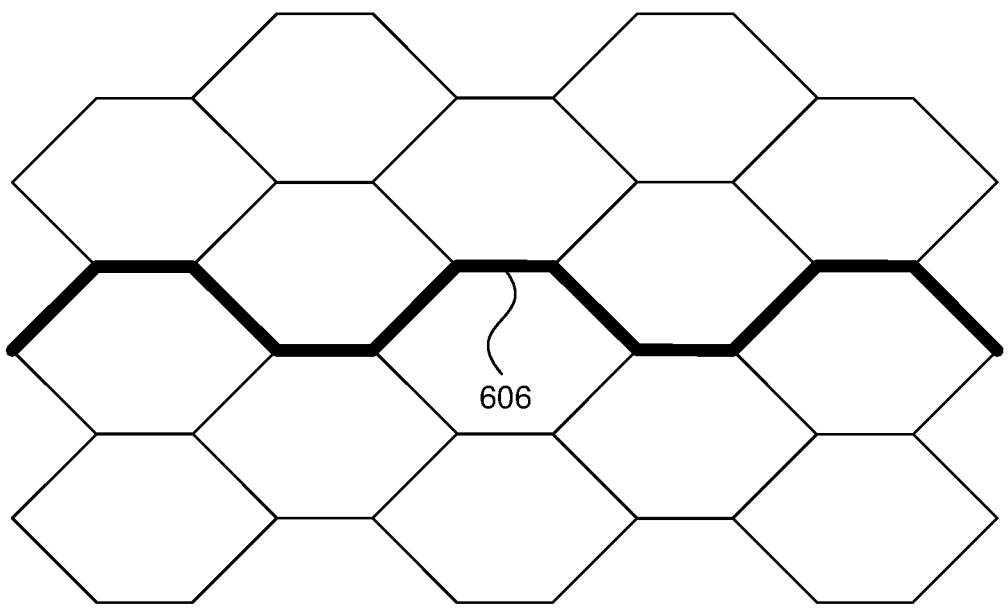

Referring now to FIG. 6, a top-down view of a layout for a weight 204 is shown in a lattice arrangement. In this embodiment, the free layer 406 and the fixed layer 402 are formed in the shape of a lattice 602. The dark line through the lattice shows the most direct path between terminals in the lattices 602, with the first embodiment showing a zig-zag line 604 and the second embodiment showing an "armchair" line 606.

Each embodiment has a different resistance dependence on distance. The zig-zag line 604 has a resistance that initially rises quickly with domain wall distance but then reaches a maximum level, while the armchair line 606 has a resistance that rises in a more linear fashion with domain wall distance. There is no available closed-form solution for the resistance in the lattice arrangement embodiments, but the relationship between domain wall position and resistance can be determined with numerical calculations.

It should be understood that terminals may be placed at any point in the lattice 602. In particular embodiments, more than two terminals may be used and such terminals may be turned on or off as needed to provide different resistance effects. The lattice 602 may furthermore take any shape and need not be the "honeycomb" pattern shown herein. For example, a repeating pattern of squares may be formed and, in general, the lattice 602 is modeled as a series of resistances connected together at junctions. Thus, any arbitrary shape, with arbitrary connections and with segments of arbitrary length, can be modeled using Kirchoff's voltage and current laws.

Figure 7:
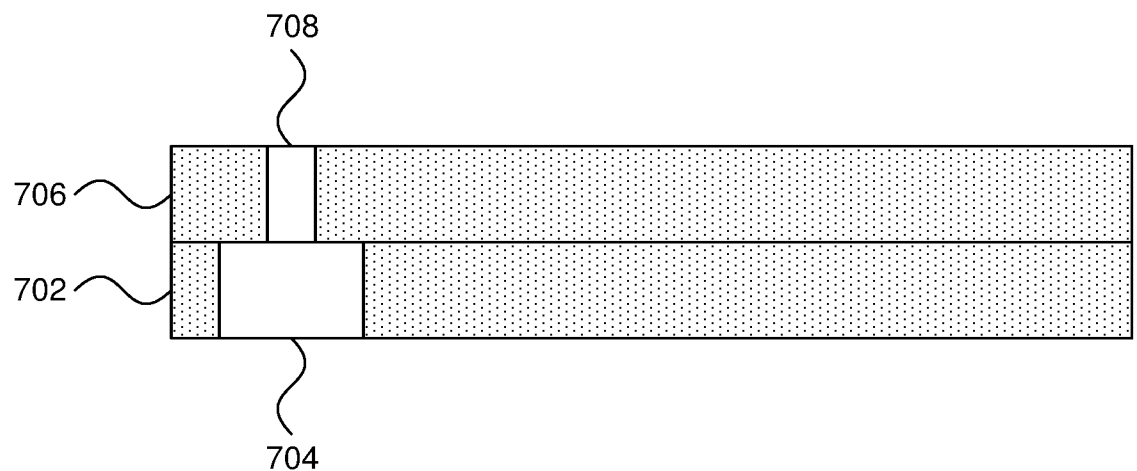
FIG. 7 is a diagram of a step in the formation of a native hardware neural network weight in accordance with the present principles.

Referring now to FIG. 7, a step in the formation of a weight 204 is shown. A bottom interconnect layer 702 is formed having a conductive interconnect 704 formed therein. The bottom interconnect layer 702 may be formed from any appropriate material such as, e.g., silicon or another non-conductive material. A lower via layer 706 is formed on top of the bottom interconnect layer 702 by depositing another layer of silicon or other non-conductive material. A conductive via 708 may be formed in the lower via layer 706 by, e.g., etching a hole in the lower via layer 706 and depositing a conductive material.

Figure 8:
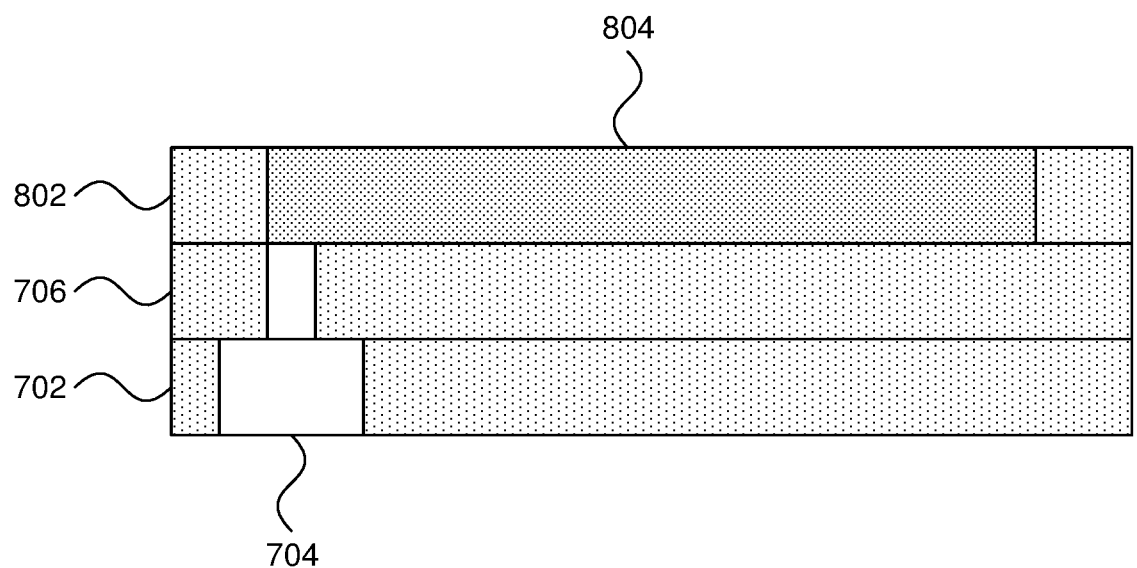
FIG. 8 is a diagram of a step in the formation of a native hardware neural network weight in accordance with the present principles.

Referring now to FIG. 8, a step in the formation of a weight 204 is shown. A layer is formed by, e.g., depositing a further layer 802 of silicon or other non-conductive material on the lower via layer 706 and subsequently forming the magnetic fixed layer 804 in the new layer 802. In one exemplary embodiment, the magnetic fixed layer 804 may be formed from a stack of materials including a layer of iridium manganese, a layer of cobalt iron, a layer of ruthenium, and a further layer of cobalt iron. The iridium manganese layer acts as an anti-ferromagnet to exchange bias in the adjacent ferromagnetic cobalt iron layer. The layers of cobalt iron and ruthenium form a synthetic anti-ferromagnet, with the ruthenium layer being designed such that both of the cobalt iron layers are anti-ferromagnetically coupled.

Figure 9:
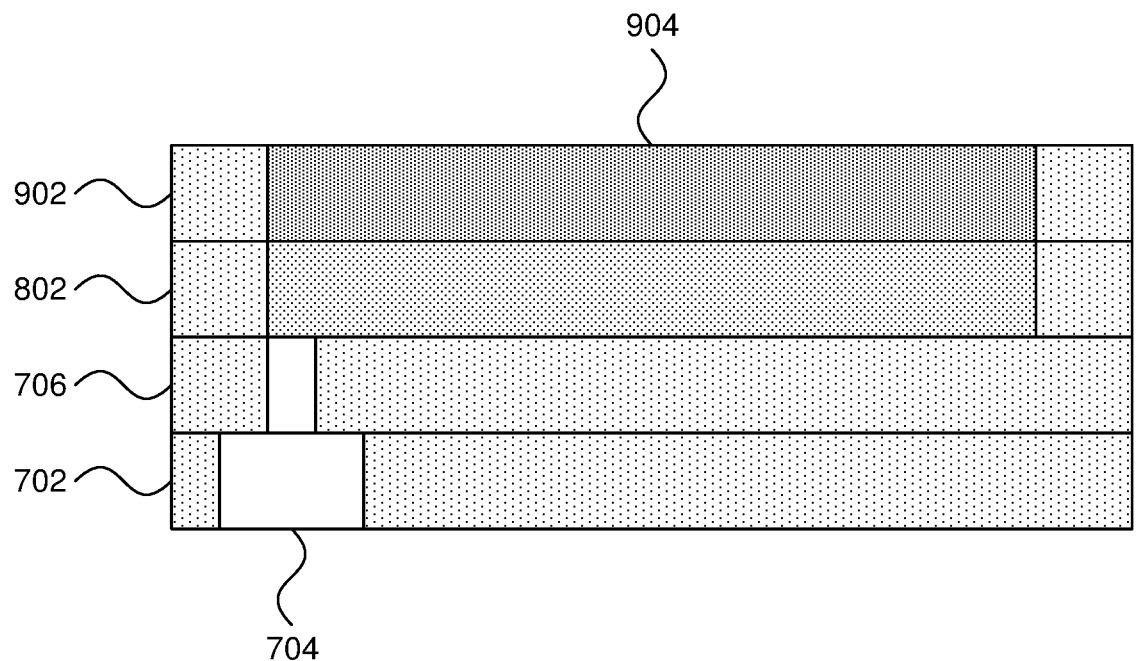
FIG. 9 is a diagram of a step in the formation of a native hardware neural network weight in accordance with the present principles.

Referring now to FIG. 9, a step in the formation of a weight 204 is shown. A layer is formed by, e.g., depositing a further layer 902 of silicon or other non-conductive material on the fixed layer 802 and subsequently forming a non-magnetic layer 904 in the new layer 902. It is specifically contemplated that the non-magnetic layer may be formed from, e.g., magnesium oxide, copper, aluminum, silver, or any other appropriately conductive, non-magnetic material that has a long spin diffusion length.

Figure 10:
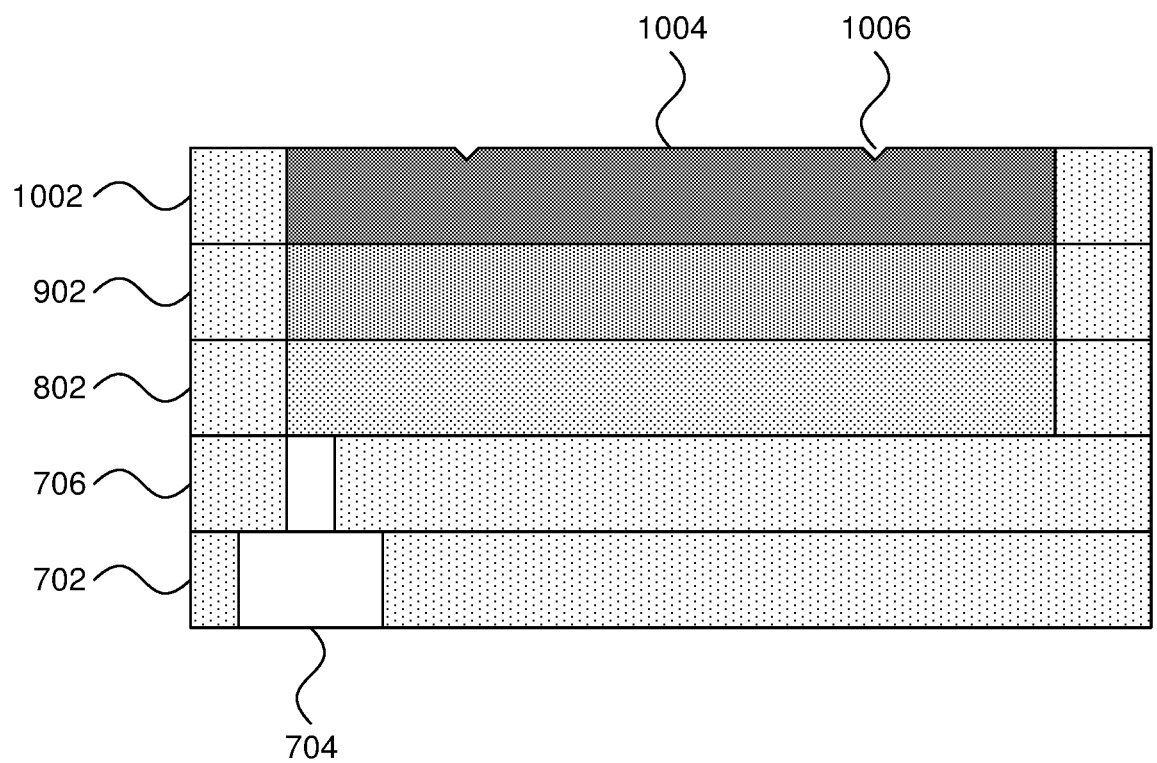
FIG. 10 is a diagram of a step in the formation of a native hardware neural network weight in accordance with the present principles.

Referring now to FIG. 10, a step in the formation of a weight 204 is shown. A layer is formed by, e.g., depositing a further layer 1002 of silicon or other non-conductive material on the non-magnetic layer 902 and subsequently forming the magnetic free layer 1004 in the new layer 1002. Notches 1006 may be formed in the magnetic free layer 1004 using any appropriate etch including, e.g., a photolithographic etch that employs a timed reactive ion etch. It should be understood that alternative embodiments may switch the order of formation of the magnetic fixed layer 804 and the magnetic free layer 1004, with the magnetic free layer being formed beneath the magnetic fixed layer. Exemplary materials for the magnetic free layer 1004 include cobalt iron and a nickel-iron alloy that has 80% nickel and 20% iron.

Figure 11:
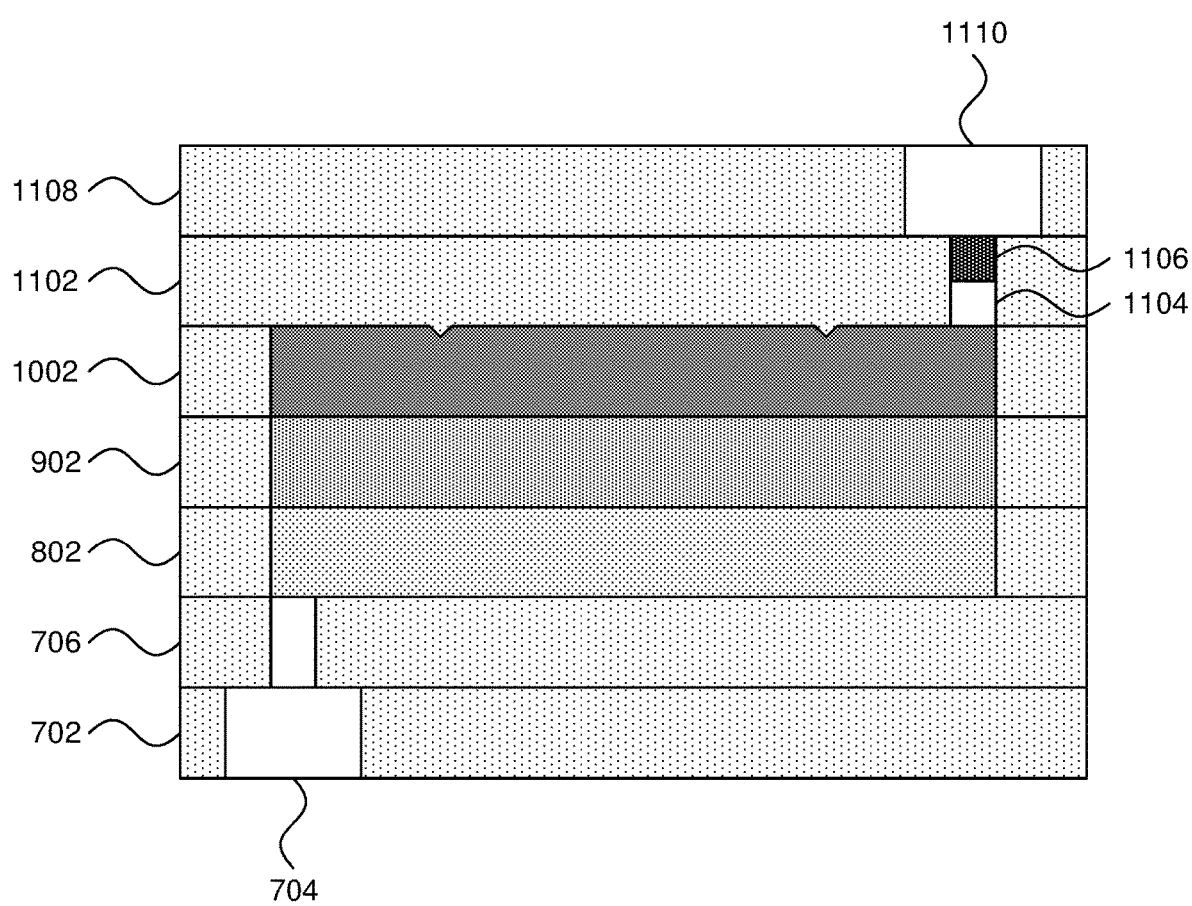
FIG. 11 is a diagram of a step in the formation of a native hardware neural network weight in accordance with the present principles.

Referring now to FIG. 11, a step in the formation of a weight 204 is shown. An upper via layer 1102 is formed by, e.g., depositing a further layer of silicon or other non-conductive material on the magnetic free layer 1002 and forming a via 1104 therein by, e.g., etching a hole and filling in a conductive material. In one particular embodiment, a symmetric diode 1106 may be formed using, e.g., a mixed ionic-electronic conduction device. An upper interconnect layer 1108 is then formed on the upper via layer 1102 with an appropriate conductive interconnect 1110.

Figure 12:
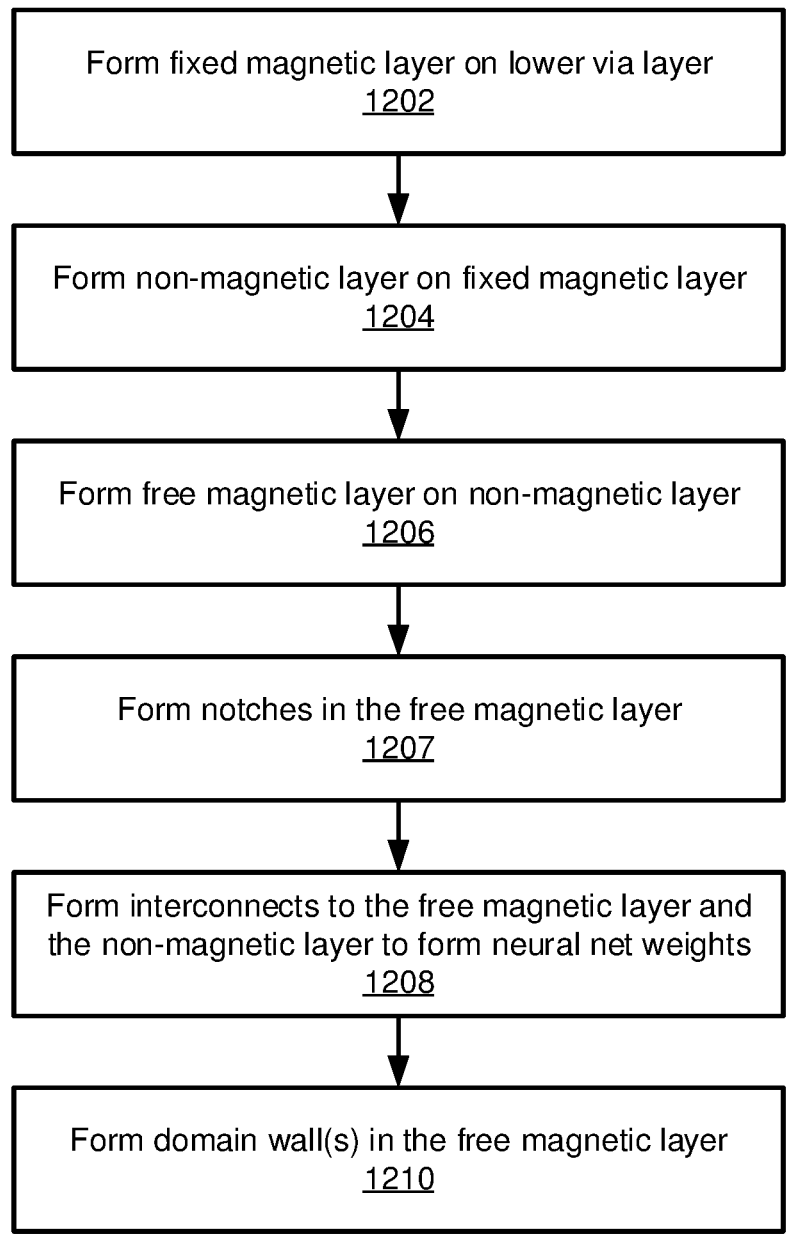
FIG. 12 is a block/flow diagram of a method of forming a native hardware neural network weight in accordance with the present principles.

Referring now to FIG. 12, a method of forming a racetrack weight 204 is shown. Block 1202 forms a magnetic fixed layer 804 on the lower via layer 706. Block 1204 then forms the non-magnetic conductive layer 904 on the magnetic fixed layer 804. Block 1206 forms the magnetic free layer 1004 on the non-magnetic conductive layer 904 and block 1207 forms notches 1006 in the magnetic free layer 1004. Block 1208 forms appropriate interconnections to connect the racetrack weight 204 to a neural network.

After the racetrack weight 204 has been formed, block 1210 forms one or more magnetic domain walls within the magnetic free layer 1004. This can be accomplished by first applying a strong magnetic field to the device to create a uniform magnetization on the free layer of each racetrack weight 204. This may be done to all of the synapses on a chip at the same time. A current is then applied to create the one or more domain walls 407, which remain fixed in the free layer until a subsequent set current is applied.

It is to be understood that the present invention will be described in terms of a given illustrative architecture; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present embodiments may include a design for an integrated circuit chip, which may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a racetrack synapse for neuromorphic applications (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A tunable resistance device, comprising:
a fixed magnetic layer having a fixed magnetization;
a free magnetic layer;
a non-magnetic conductive layer directly between the fixed magnetic layer and the free magnetic layer, wherein the fixed magnetic layer, the free magnetic layer, and the non-magnetic conductive layer are formed in a lattice of wires, with each wire in the lattice being formed from a stack of the fixed magnetic layer, the free magnetic layer, and the non-magnetic conductive layer;
a first via in contact with the fixed magnetic layer; and
a second via in contact with the free magnetic layer, wherein the first via and the second via are not vertically aligned.

2. The tunable resistance device of claim 1, wherein one of the first via and the second via comprises a symmetric diode.

3. The tunable resistance device of claim 2, wherein the symmetric diode is a mixed ionic-electronic conduction diode.

4. The tunable resistance device of claim 1, wherein the free magnetic layer has a single magnetic domain wall.

5. The tunable resistance device of claim 1, wherein the free magnetic layer has a plurality of magnetic domain walls.

6. The tunable resistance device of claim 1, wherein the neural network synapse has a tunable resistance based on a number and position of domain walls in the free magnetic layer.

7. The tunable resistance device of claim 1, wherein the free magnetic layer comprises one or more notches to pin magnetic domain walls.

8. A neural network, comprising:
a plurality of neurons, comprising a layer of input neurons, one or more layers of hidden neurons, and a layer of output neurons;
a plurality of arrays of synapses, each array of synapses being configured to accept voltage pulses from a first layer of neurons and to output current to a second layer of neurons during a feed forward operation, each synapse in each array of synapses having a respective settable resistance and comprising:
a fixed magnetic layer having a fixed magnetization;
a free magnetic layer;
a non-magnetic conductive layer directly between the fixed magnetic layer and the free magnetic layer;
a first via in contact with the fixed magnetic layer; and
a second via in contact with the free magnetic layer.

9. The neural network of claim 8, wherein one of the first via and the second via of each synapse comprises a symmetric diode.

10. The neural network of claim 9, wherein each symmetric diode is a mixed ionic-electronic conduction diode.

11. The neural network of claim 8, wherein the free magnetic layer of each synapse has a single magnetic domain wall that is positioned at one of one or more notches.

12. The neural network of claim 8, wherein the free magnetic layer of each synapse has a plurality of magnetic domain walls, each positioned at one of a plurality of notches.

13. A method of forming a tunable resistance device, comprising:
forming a fixed magnetic layer having a fixed magnetization;
forming a non-magnetic conductive layer on the fixed magnetic layer;
forming a free magnetic layer on the non-magnetic conductive layer, wherein the fixed magnetic layer, the free magnetic layer, and the non-magnetic conductive layer are formed in a lattice of wires, with each wire in the lattice being formed from a stack of the fixed magnetic layer, the free magnetic layer, and the non-magnetic conductive layer;

forming a first via in contact with the free magnetic layer; and forming a second via in contact with the fixed magnetic layer.

14. The method of claim 13, further comprising forming a symmetric diode in one of the first via and the second via.

15. The method of claim 14, wherein the symmetric diode is a mixed ionic-electronic conduction diode.

16. The method of claim 13, further comprising inducing a uniform magnetization in the free magnetic layer and then forming one or more initial domain walls in the free magnetic layer.

17. The method of claim 13, further comprising forming one or more notches in the free magnetic layer to pin magnetic domain walls.

* * * * *